Figure 4:
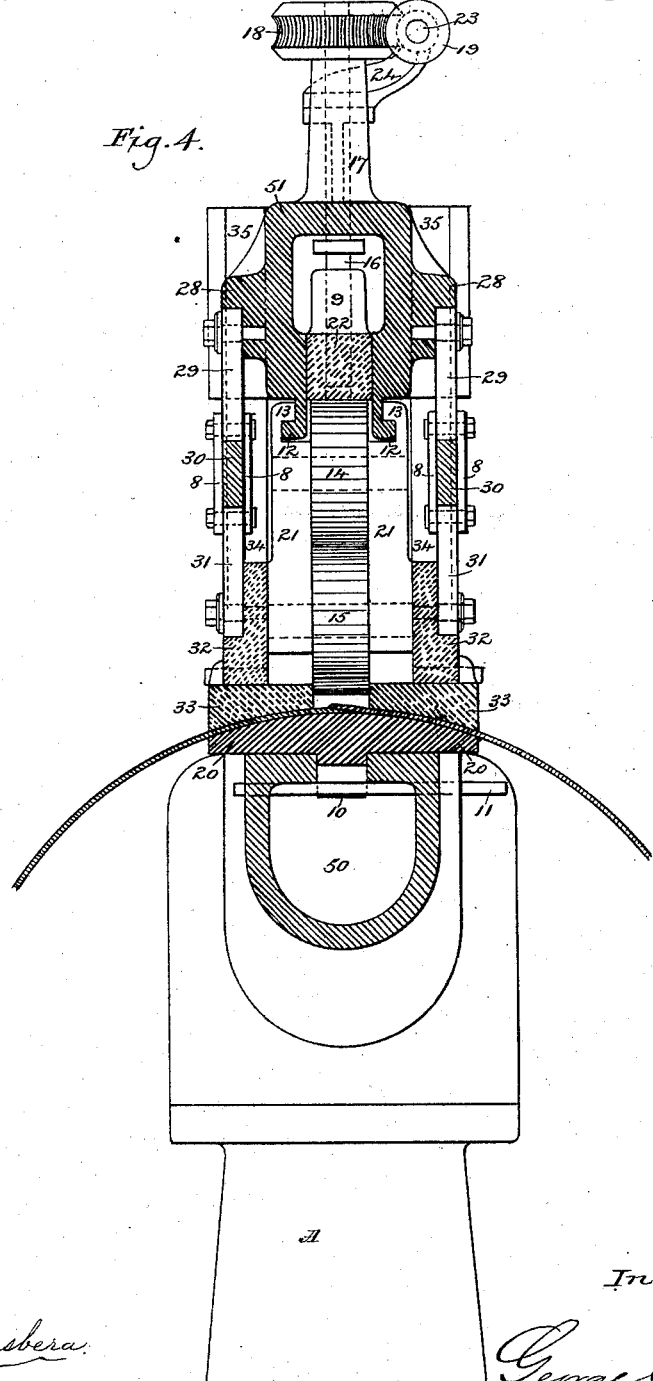

(No Model.) 8 Sheets—Sheet 1.
G. S. STRONG.
MACHINE FOR WELDING TUBES.
No. 324,610. Patented Aug. 18, 1885.
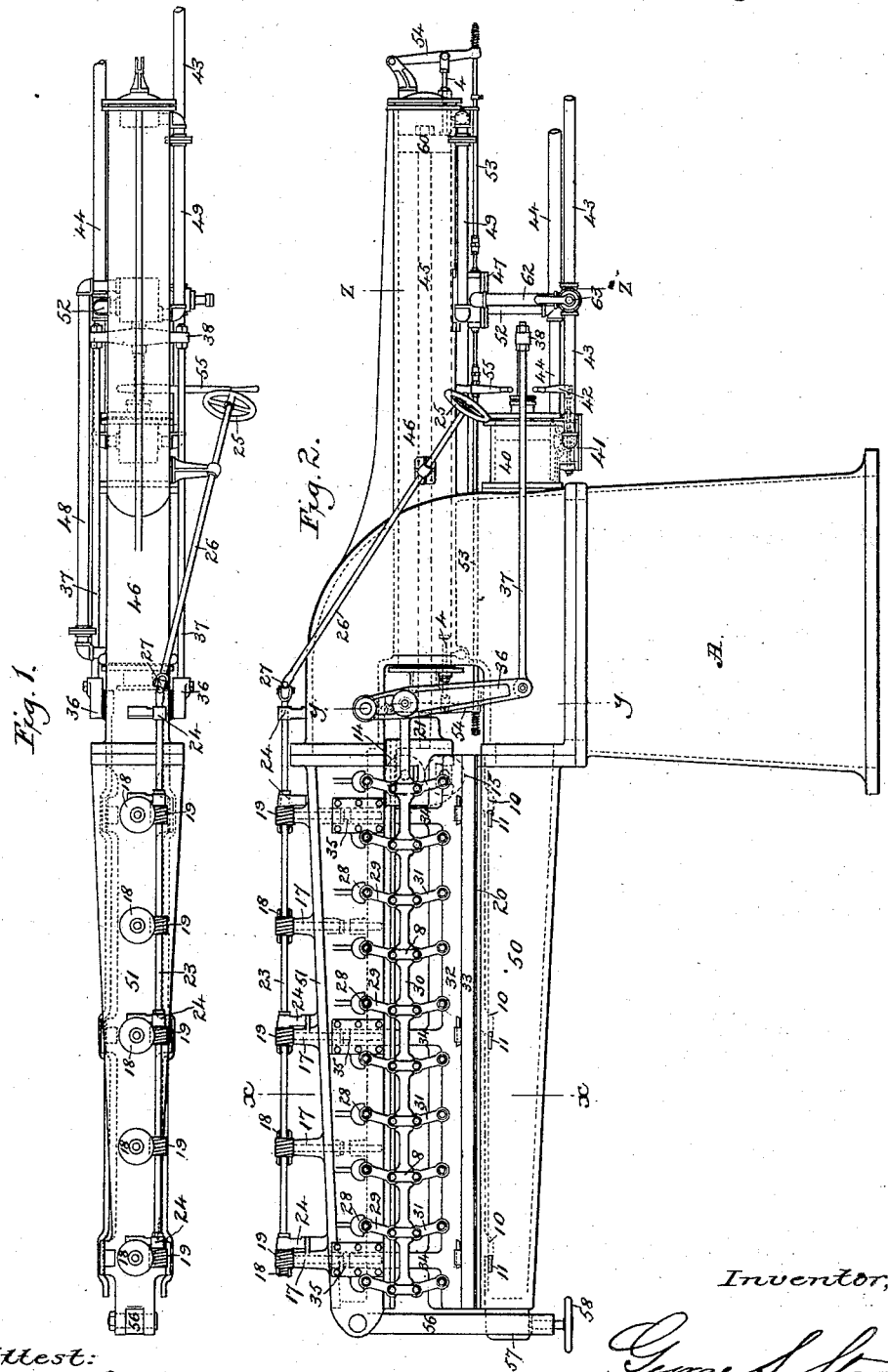

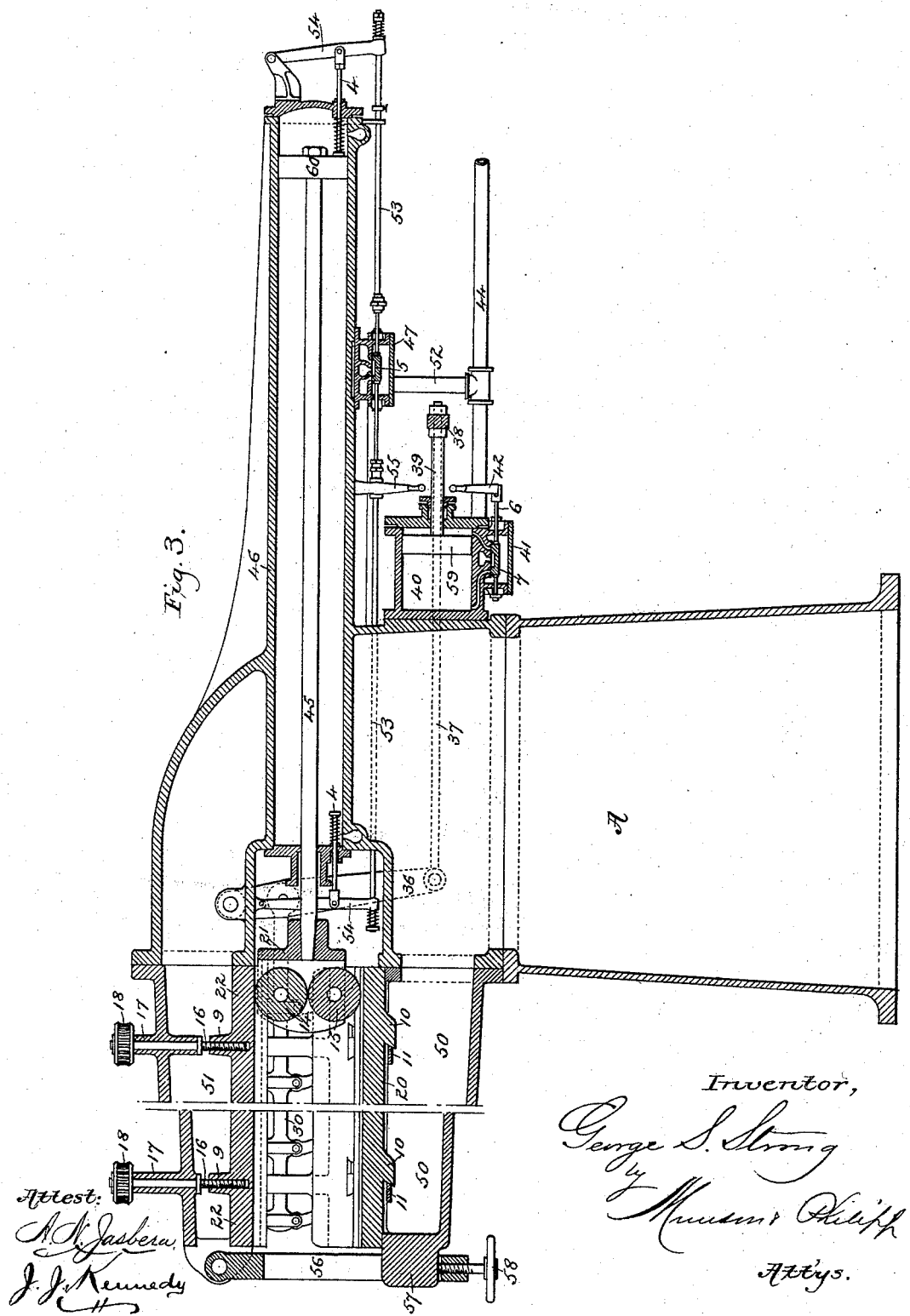

(No Model.) 8 Sheets—Sheet 3.

G. S. STRONG.
MACHINE FOR WELDING TUBES.

No. 324,610. Patented Aug. 18, 1885.

Attest:
A. N. Jasbera
J. A. Hoovy

Inventor,
George S. Strong
by Munson & Philipp
Att'ys.

(No Model.) 8 Sheets—Sheet 4.

G. S. STRONG.
MACHINE FOR WELDING TUBES.

No. 324,610. Patented Aug. 18, 1885.

Attest:
A. N. Jasbera
J. A. Hoory

Inventor,
George S. Strong
by Munson & Philipp
Attys.

(No Model.) 8 Sheets—Sheet 5.

G. S. STRONG.
MACHINE FOR WELDING TUBES.

No. 324,610. Patented Aug. 18, 1885.

Attest:
A. N. Jasbeira
J. A. Hoovey

Inventor,
George S. Strong
by Munson & Philipp
Att'ys.

N. PETERS. Photo-Lithographer, Washington, D. C.

(No Model.)  
8 Sheets—Sheet 6.

G. S. STRONG.
MACHINE FOR WELDING TUBES.

No. 324,610.  
Patented Aug. 18, 1885.

(No Model.)

8 Sheets—Sheet 7.

G. S. STRONG.
MACHINE FOR WELDING TUBES.

No. 324,610. Patented Aug. 18, 1885.

(No Model.) 8 Sheets—Sheet 8.
G. S. STRONG.
MACHINE FOR WELDING TUBES.
No. 324,610. Patented Aug. 18, 1885.

Attest:
A. N. Jasbera
J. A. Moore

Inventor,
George S. Strong
by Munsen & Philipp
Att'ys.

UNITED STATES PATENT OFFICE.

GEORGE S. STRONG, OF PHILADELPHIA, PENNSYLVANIA.

MACHINE FOR WELDING TUBES.

SPECIFICATION forming part of Letters Patent No. 324,610, dated August 18, 1885.

Application filed July 14, 1884. (No model.)

*To all whom it may concern:*

Be it known that I, GEORGE S. STRONG, a citizen of the United States, residing in the city of Philadelphia, county of Philadelphia, and State of Pennsylvania, have invented certain new and useful Improvements in Machines for Welding Tubes, fully described and represented in the following specification and the accompanying drawings, forming a part of the same.

This invention relates to a mechanism which is adapted for use in welding the longitudinal seams of heavy iron tubes, and particularly such tubes as are designed for steam and water boilers and tanks and for other similar purposes, and which as now commonly constructed have their seams closed by riveting.

It is the object of the invention to provide a strong and simple mechanism by which this welding can be accomplished in a rapid and reliable manner, thereby saving much of the time and labor required to form these seams by riveting, and at the same time producing a much stronger and more reliable seam and greatly improving the appearance of the finished article.

In a practical embodiment of the present invention the sheet of iron, after having been bent to the form of a tube with its edges lapped the proper distance for the seam, and after having these lapped edges properly heated, is placed around a horn or horizontal support in such position that the lapped edges which are to form the seam will lie along its top. When in this position, the tube is grasped by a pair of clamps, which are operated by steam or hydraulic power, and are arranged so as to press downward upon the tube at each side of the seam, and thereby hold the lapped edges securely in position. While thus clamped the lapped and heated edges are acted upon by one or more rolls, which are mounted in a suitable head and are driven backward and forward by steam or hydraulic power, so as to press and weld the edges of the sheet together, and thus form the longitudinal seam in the tube.

The details in the construction of the organization thus outlined will now be fully described in connection with the accompanying drawings, in which—

Figure 5:
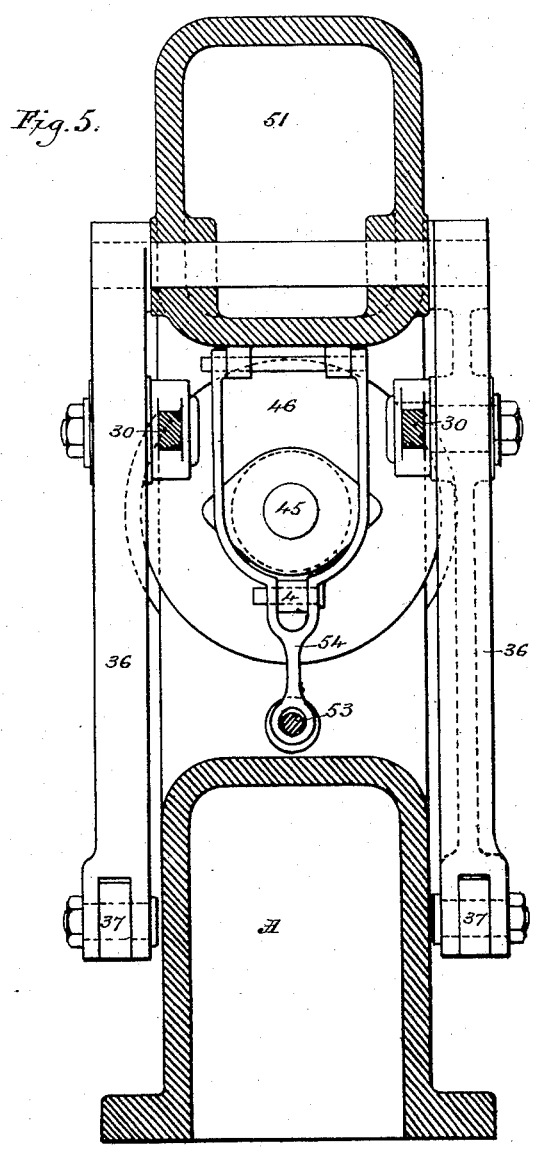
Figure 6:
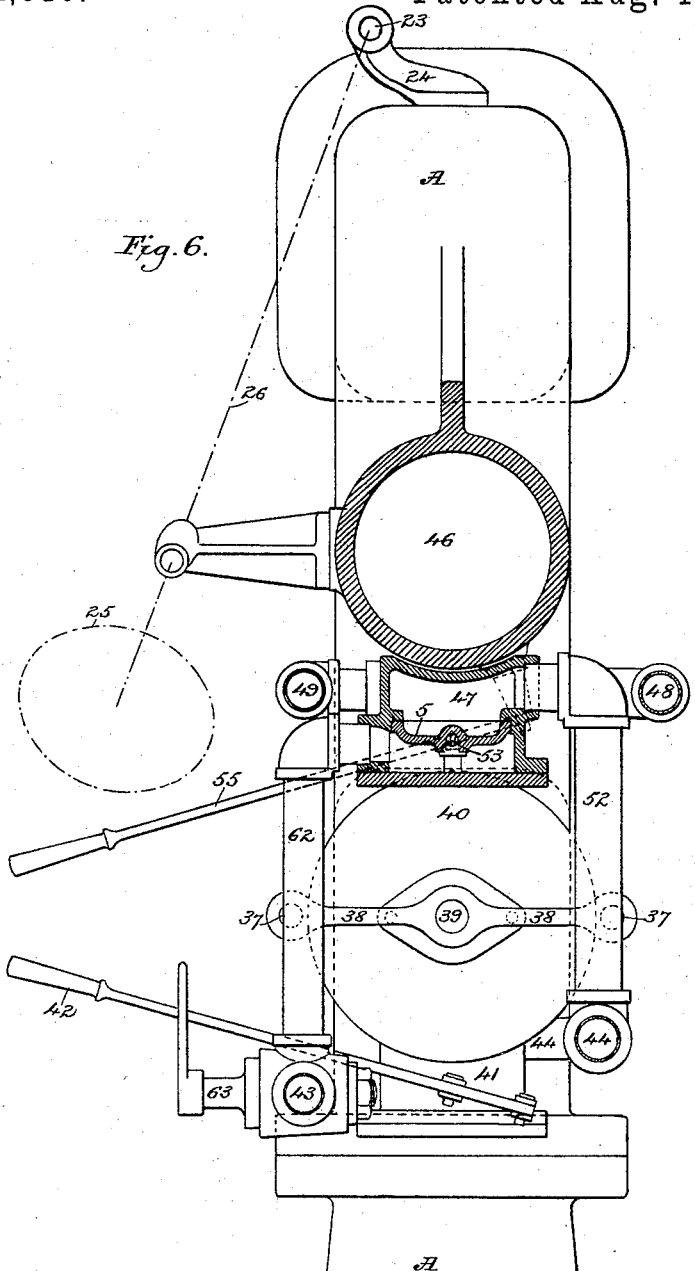
Figure 7:
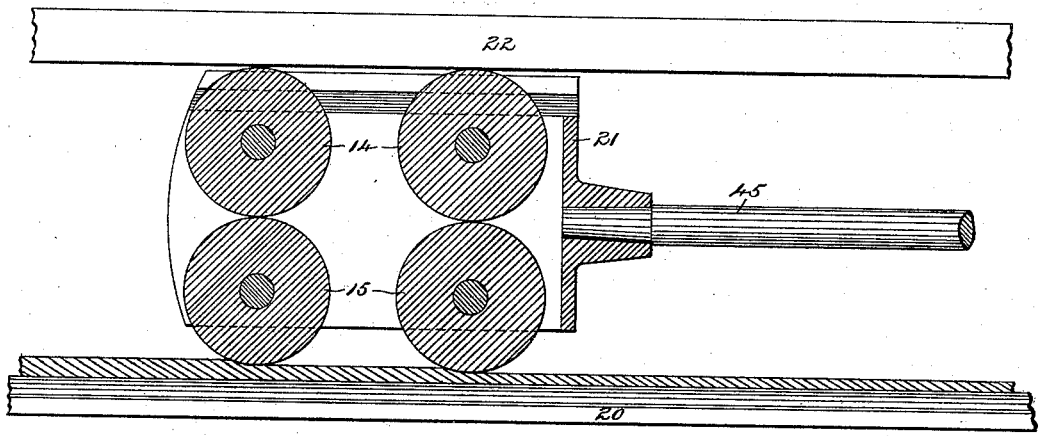
Figure 8:
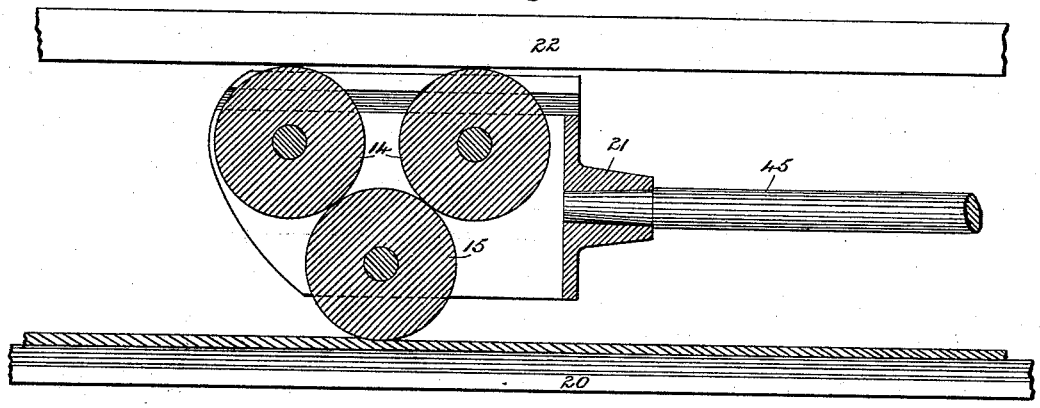
Figure 9:
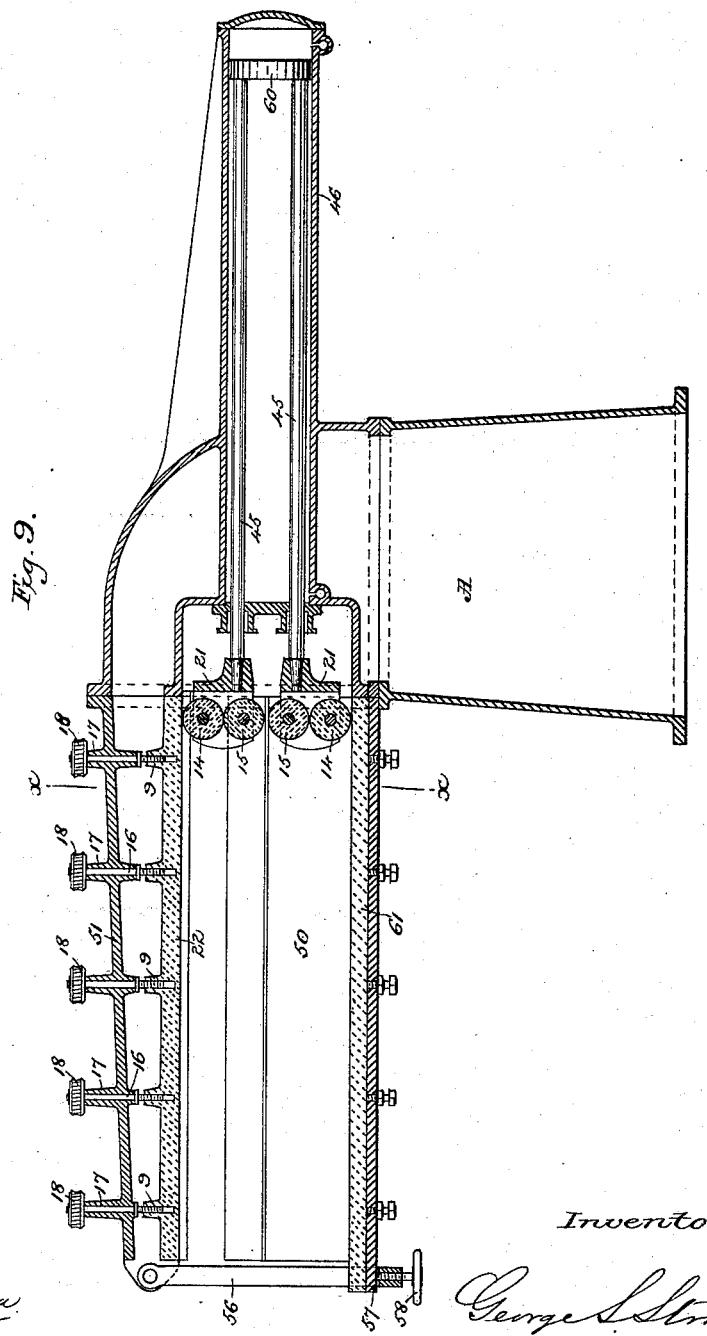
Figure 10:
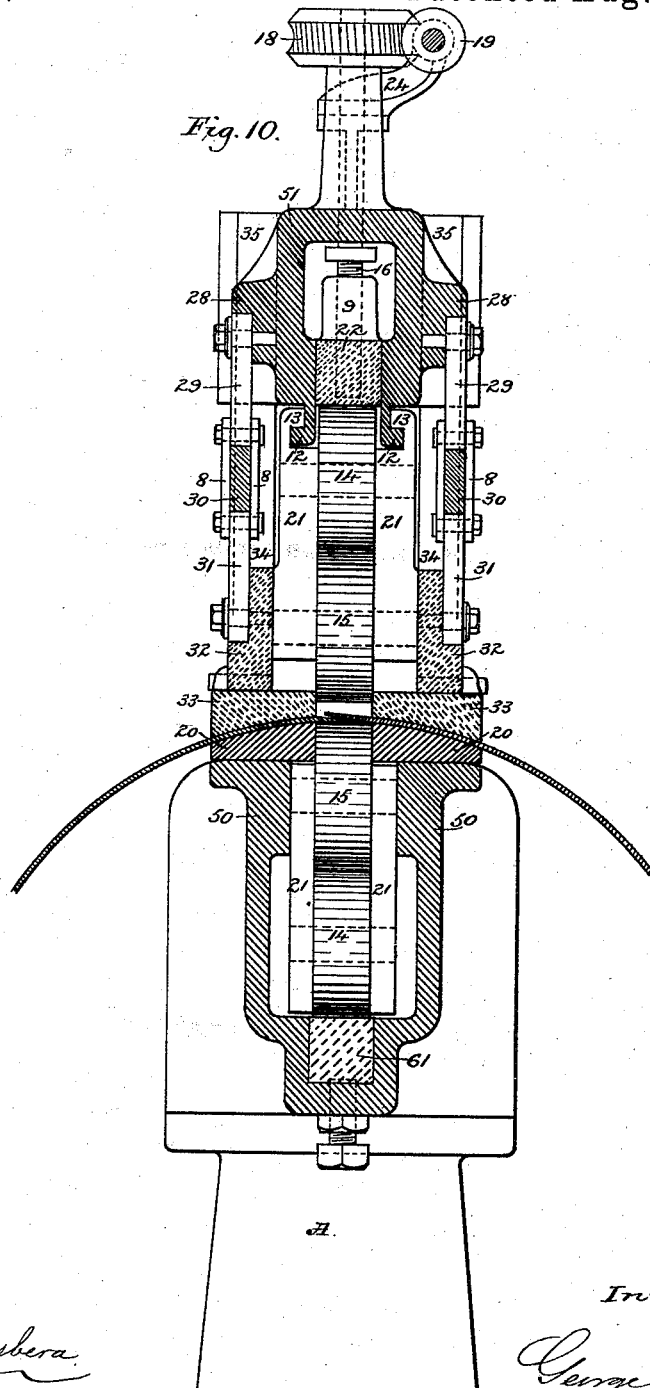

Figure 1 is a plan view of a mechanism embodying the present invention. Fig. 2 is a side elevation of the same. Fig. 3 is a longitudinal vertical section of the same upon an enlarged scale. Fig. 4 is a transverse vertical section of the same, upon a still more enlarged scale, taken upon the line $xx$ of Fig. 2. Fig. 5 is a similar view upon a like scale, taken upon the line $yy$ of the same figure. Fig. 6 is a similar view upon a like scale, taken upon the line $zz$ of the same figure. Figs. 7 and 8 are sectional details upon an enlarged scale, showing different forms of welding-rolls. Fig. 9 is a sectional elevation showing welding-rolls of still another form; and Fig. 10 is a cross-section, upon an enlarged scale, taken upon the line $xx$ of Fig. 9.

Referring to said figures, it is to be understood that A represents an iron or other base of sufficient size and weight to properly support the various parts of the mechanism. This base is provided upon one side with a horn or support, 50, which extends horizontally outward from the base, and is of such size as to permit of its being entered into a tube of the smallest diameter which it is desired to weld upon the machine, and of such length as to extend entirely through and project a short distance beyond the end of the tube.

The support 50, which may be solid, but will preferably be made hollow, as shown in the present case, is provided upon its top with a plate, 20, which is curved upon its upper surface, so as to conform to the interior of the tube, and is secured in position by means of lugs 10, which enter a recess formed in the top of the horn, and keys 11, which pass through lateral openings in the same, as shown in Fig. 4.

Directly above the horn or support 50 the base A is provided with an arm, 51, which is of the same length as the horn. This arm is provided upon its under side with two projecting portions, 12, in the sides of which are formed longitudinal recesses, into which enter projections 13, formed upon the upper side of a reciprocating head, 21, as best shown in Fig. 4. The head 21 is provided with a vertical recess or slot, in which are located two rolls, 14 15, the shafts of which are journaled in the sides of the head in such manner as to be capable of a slight vertical movement, the purpose of which will hereinafter appear. The arm 51 is also provided on its under side with a longitudinal recess, in which is located a track-bar, 22, on the upper side of which are formed a number of nuts, 9, which receive the threaded ends of a series of vertical shafts, 16, which are journaled in elongated bearings 17, formed upon the upper side of the arm 51, and are provided at their upper ends with worm-gears 18, which engage with a series of worms, 19, secured to a horizontal shaft, 23, which is mounted in brackets 24, rising from the top of the arm 51, and is operated from a hand-wheel, 25, through a rod, 26, which is connected to the shaft by a universal joint, 27, as shown in Figs. 1 and 2. From this arrangement it results that by turning the hand-wheel 25 the track-bar 22 can be adjusted to any desired vertical position, so as to hold the roll 15 at any desired distance from the plate 20 upon the top of the horn 50. The purpose of this adjustment will more fully appear when the operation of the mechanism is explained.

The arm 51 is provided upon each side with a series of projections, 28, upon the under sides of which are formed curved bearings, in which are pivotally secured the upper ends of two series of short arms, 29, the lower ends of which rest in similar bearings formed in the upper sides of a pair of bars, 30, as best shown in Fig. 2. The lower ends of the arms 29 are connected by links 8 with the upper ends of corresponding series of arms, 31, which rest in curved bearings formed upon the under sides of the bars 30, with the lower ends pivotally secured in similar bearings formed in a pair of bars, 32, to which are secured a pair of clamping-bars, 33, which are curved upon their under sides to conform to the curvature of the plate 20, as shown in Fig. 4. From this arrangement it will be seen that the arms 29 31 constitute in effect a series of toggle-joints, which are so arranged that by moving the bars 30 longitudinally the clamping-bars 33 will be lowered and raised to and from the plate 20. To prevent any lateral movement of the clamping-bars 33, the bars 32 are provided with a number (three, as shown in the present case) of vertical arms, 34, which rest in long bearings 35 formed upon the sides of the arm 51 in such manner as to move up and down freely as the clamping-bars are raised and lowered.

The clamping apparatus just described is operated as follows: Each of the bars 30 is provided with a rearward extension, which is connected to a lever, 36, one end of which is fulcrumed to the base A, while the other end is connected by a rod, 37, with a cross-head, 38, to the middle of which is secured the piston-rod 39 of a small steam-cylinder, 40. The cylinder 40 is provided with the usual steam-chest, 41, having the usual induction and exhaust ports, and an ordinary D-valve, 7, the rod 6 of which is operated by a hand-lever, 42. The cylinder 40 receives its supply of steam through an induction-pipe, as 43, leading from the boiler, and exhausts into a similar pipe, 44, leading to the open air.

The welding-rolls 14 15 are operated as follows: The head 21, in which these rolls are mounted, as before explained, is connected to the piston-rod 45 of a steam-cylinder, 46, which is mounted on the base A in the rear of the support 50. This cylinder is provided with an ordinary steam-chest, 47, having the usual induction and exhaust ports, which are connected with the opposite ends of the cylinder by means of pipes 48 49, and the usual exhaust-port, which is connected by a pipe, 52, with the exhaust-pipe 44 of the cylinder 40. The cylinder 46 receives its supply of steam through a pipe, 62, which communicates with the main steam-pipe 43. The chest 47 is provided with an ordinary D-valve, 5, the rod 53 of which extends past both ends of the cylinder and is connected to a pair of levers, 54, which are fulcrumed in brackets extending from the ends of the cylinder, and are provided with tappet-rods 4, which pass through suitable stuffing-boxes and extend a short distance into the cylinder. The rod 53 is also provided with a hand-lever, 55, by which the valve 5 can be operated to stop and start the welding-rolls, as will hereinafter be explained.

In order to prevent the arm 51 and support 50 from springing apart by reason of the great pressure exerted by the welding-rolls during the welding operation the arm is provided with a yoke, 56, which is pivoted in the end of the arm in such manner that when swung downward, as shown in Figs. 2 and 3 it will embrace a projection, 57, formed on the end of the support. The yoke is provided at its lower end with a set-screw, 58, which, after the yoke is in this position, can be driven inward so as to impinge against the projection 57, and thus lock the arm 51 and support 50 securely together.

The operation of the mechanism thus organized is as follows: The tube which is to be welded, having been properly heated, will be placed around the horn or support 50 in such position that the lapping edges which are to form the seam will lie directly above the center of the plate 20, as is shown in Fig. 4. The yoke 56 will then be turned to the position shown in Figs. 2 and 3, and the screw 58 tightened so as to lock the support 50 and the arm 51 together and prevent them from springing. The throttle 63 of the pipe 43 will then be opened, and the valve 7 shifted by the hand-lever 42 so as to admit steam in front of the piston 59 of the cylinder 40, and the steam thus admitted will force said piston over to the position shown in Fig. 3, thereby bringing the arms 29 31 into line, or nearly into line, so as to force the clamping-bars 33 downward onto the tube at the sides of the lapped portions, thereby clamping the edges of the tube firmly between the clamping-bars and the side portions of the plate 20, as shown in Fig. 4. The bars 33, extending as they do the entire length of the tube, will hold the tube to the plate 20, so as to prevent the possibility of any warping or buckling during the welding operation. These clamps also, by grasping the tube upon both sides of the seam, prevent any drawing of the metal and consequent enlargement of the tube during the welding operation. The valve 5 will then be shifted by the hand-lever 55 so as to admit steam behind the piston 60 of the cylinder 46. The steam thus admitted will drive said piston forward toward the opposite end of the cylinder, thereby forcing the welding-rolls 14 15 over the lapped edges of the tube. As the piston 60 nears the end of its stroke toward the front end of the cylinder it will drive the rod 4 outward, and thus shift the valve 5 so as to admit steam in front of the piston and permit the steam behind the piston to be exhausted. This will start the piston and welding-rolls in the opposite direction, and when they arrive at their original position the valve 5 will be again reversed in the manner just described, and so the operation will continue to be repeated until the welding of the seam is effected. This tappet mechanism by which the valve 5 is automatically shifted so as to reverse the movement of the piston 60 is a feature of great importance, as by this means the piston and the welding-rolls can be driven at a high rate of speed without danger of the piston striking violently against the cylinder-heads at the ends of its strokes. During this welding operation, the middle portion of the plate 20 sustains the lapped edges of the tube against the pressure of the welding-rolls, or, in other words, acts as an anvil for the rolls. As the welding progresses the hand-wheel 25 will be operated so as to force the bar 22 downward and cause the rolls 14 15 to constantly bear against the seam with a proper degree of pressure. The apparatus for adjusting the bar 22 may be provided with a suitable pointer and scale, by which the operator can determine when the bar has been adjusted to the proper position to reduce the seam to exactly the desired thickness. As soon as the welding is completed the lever 55 will be operated so as to throw the valve 5 onto its center, and thus arrest the movement of the piston 60 and the rolls 14 15, after which the lever 42 will be operated so as to shift the valve 7 and admit steam upon the opposite side of the piston 59, so as to drive said piston forward to its original position and raise the clamping-bars 33 from the tube. By then loosening the screw 58 and turning the yoke 56 up from the position shown in Fig. 3, the completed tube can be removed and another inserted into position to be welded.

It is, of course, to be understood that, instead of steam, water, compressed air, or other fluid may be employed in the cylinders 40 46, if preferred.

Many modifications may also be made in the construction and arrangement of the welding-rolls without departing from the principle of the present invention. Three of the modifications which may thus be made are illustrated in Figs. 7, 8, 9, and 10.

In the construction shown in Fig. 7, instead of employing a single pair of the welding-rolls, two pairs are employed, the advance pair being slightly smaller in diameter than the rear pair, by which means a gradual reduction in the thickness of the seam is effected as the pairs of rolls pass successively over it.

In the construction shown in Fig. 8 three rolls are employed, one of which runs in contact with the seam to be welded, while the other two run in contact with the track-bar 22.

In the construction shown in Figs. 9 and 10 two pairs of welding-rolls are employed, one pair of which travels over the seam upon the outside of the tube, while the other pair travels upon the inside and acts as an anvil for the rolls upon the outside. To effect this the plate 20, upon the top of the support 50, is made in two parts, or is provided with a longitudinal opening extending the greater part of its length, while the bottom of said support is provided with an adjustable track-bar, 61, similar to the bar 22. In this case, also, in order to drive the two heads carrying the two pairs of welding-rolls, the piston 60 is provided with two rods, located one above the other, and at its forward end the cylinder 46 is provided with two stuffing-boxes, through which these rods pass to be connected to the heads carrying the two pairs of rolls. In all other respects the construction and operation of the mechanism when thus organized is the same as already described.

It is also to be understood that many modifications may be made in the various parts of the operating mechanism without departing from or losing the advantages of the invention. For example, the links 8 may be provided with nuts, the bars 30 being screw-threaded to engage therewith, and provided with connections by which they receive a rotary instead of a reciprocating movement. Or, instead of the toggle-joint formed by the arms 29 31, the bars 30 may be provided with a series of inclines, which act upon corresponding inclines upon the bars 32, so that said bars will act upon the principle of a wedge; or, in fact, any other suitable mechanical devices may be employed for this purpose, so long as sufficient power is obtained to effect the proper clamping of the tube.

The track-bar 22, instead of being adjusted by means of the screws and worm-gears and worms, may be provided with any other suitable form of mechanical devices for effecting the same result. The yoke 56 may also be of a different form from that shown. Instead of being made in a single piece and arranged to swing out from the end of the support, it may be made in two parts, hinged to the sides of the arm 51, and arranged to swing down and be fastened together beneath the projection 57.

The tappet mechanism for automatically reversing the valve 5 may also be modified greatly in form and arrangement, or some other suitable form of valve-gear may be employed in its stead, so long as the reversal of the valve is effected at the end of each stroke in time to prevent the piston 60 from striking against the cylinder-heads.

What I claim is—

1. In a machine for welding tubes, the combination, with a support adapted to enter the tube, of clamps arranged to clamp the tube upon each side of the seam, a roll or rolls arranged to be passed back and forth along said seam, and means for operating said roll or rolls, substantially as described.

2. The combination, with a support adapted to enter the tube, of clamps arranged to clamp the tube upon each side of the seam, a roll or rolls arranged to be passed back and forth along said seam, means for operating said roll or rolls, and an adjustable track-bar arranged to press said roll or rolls against the seam, substantially as described.

3. The combination, with the horn or support 50, of clamps arranged to clamp the tube upon both sides of the seam, a roll or rolls arranged to be passed back and forth along said seam, and means, as the yoke 56, for supporting the outer end of said horn or support, substantially as described.

4. The combination, with the horn or support 50, of clamps arranged to clamp the tube upon both sides of the seam, a roll or rolls arranged to be passed back and forth along said seam, an adjustable track-bar arranged to press said roll or rolls against the seam, and means, as the yoke 56, for supporting the outer end of said horn or support, substantially as described.

5. The combination, with the horn or support 50, of the clamps arranged to clamp the tube upon both sides of the seam, and the cylinder 40, piston 59, and connections for operating said clamps, substantially as described.

6. The combination, with the horn or support 50, of the clamping-bars 33, arranged to clamp the tube upon both sides of the seam, and the cylinder 40, piston 59, toggle-joints 29 31, and connections for operating said clamping-bars, substantially as described.

7. The combination, with the horn or support 50, of the rolls, adjustable track-bar 22, and the cylinder 46, piston 60, and connections for operating said rolls, substantially as described.

8. The combination, with the horn or support 50, of the clamps for clamping the tube upon both sides of the seam, the welding roll or rolls, and the cylinder 46, piston 60, and connections for operating said roll or rolls, substantially as described.

9. The combination, with the horn or support 50, of the clamps for clamping the tube upon both sides of the seam, the welding-rolls, the adjustable track-bar 22, and the cylinder 46, piston 60, and connections for operating said rolls, substantially as described.

10. The combination, with the horn or support 50, of the clamps 33, the welding-rolls, the adjustable track-bar 22, the yoke 56, and the cylinder 46, piston 60, and connections for operating said rolls, substantially as described.

11. The combination, with the welding-rolls, of the cylinder 46, piston 60, piston rod or rods 45, valve 5, and connections by which said valve is automatically reversed as the piston nears the end of each stroke, substantially as described.

12. The combination, with the welding-rolls, of the cylinder 46, piston 60, piston rod or rods 45, valve 5, valve-rod 53, tappet-rods 4, and connections, substantially as described.

13. The combination, with the horn or support 50 and clamps 33, of the two sets of welding-rolls, one set being arranged to operate upon the outside and the other upon the inside of the tube, substantially as described.

14. The combination, with the horn or support 50 and clamps 33, of the two sets of welding-rolls and the two adjustable track-bars 22 61, substantially as described.

In testimony whereof I have hereunto set my hand in the presence of two subscribing witnesses.

GEORGE S. STRONG.

Witnesses:
JOHN SVENSON,
C. HARRY SHOEMAKER.